United States Patent [19]

Arai et al.

[11] Patent Number: 5,004,378
[45] Date of Patent: Apr. 2, 1991

[54] CLAMPED CUTTING TOOL

[75] Inventors: Tatsuo Arai, Kitamoto; Katsumi Haga, Tokyo, both of Japan

[73] Assignee: Mitsubishi Metal Corporation, Tokyo, Japan

[21] Appl. No.: 353,696

[22] Filed: May 18, 1989

[30] Foreign Application Priority Data

May 19, 1988 [JP] Japan .............................. 63-66152[U]
May 31, 1988 [JP] Japan .............................. 63-72508[U]
Apr. 28, 1989 [JP] Japan .............................. 1-50352[U]

[51] Int. Cl.$^5$ .............................................. B23C 5/22
[52] U.S. Cl. ..................................... 407/106; 407/101;
407/104; 407/107
[58] Field of Search .................................. 407/101–107

[56] References Cited

U.S. PATENT DOCUMENTS

| 3,268,978 | 8/1966 | Reck | 407/104 |
| 3,299,489 | 1/1967 | Pohle | 407/104 |
| 3,525,136 | 8/1970 | Crosby | 407/101 |
| 3,815,195 | 6/1974 | McCreery | 407/105 |

FOREIGN PATENT DOCUMENTS

| 0051775 | 5/1982 | European Pat. Off. . |
| 1177067 | 9/1985 | U.S.S.R. .............. 407/104 |

Primary Examiner—Frederick R. Schmidt
Assistant Examiner—Jack Lavinder
Attorney, Agent, or Firm—Cushman, Darby & Cushman

[57] ABSTRACT

The present invention concerns to a clamped cutting tool used in the metalworking field. The clamped cutting tool includes a tool-holder, a shim member placed on the tool-holder, a cutting insert placed on the shim member, and a locking pin held in engagement with the tool-holder for clamping the cutting insert. The tool-holder includes a forward end portion having an insert receving recess formed therein, the recess having a bottom wall and at least one side wall extending upwardly from the bottom wall, the bottom wall including a pin-receiving hole of a circular cross-section formed therein so as to extend downwardly. The shim member has a bore of a circular cross-section formed therethrough, the shim member being disposed on the bottom wall of the recess in such a manner that the bore communicates with and is concentric to the hole of the tool-holder. The cutting insert has an aperture of a circular cross-section formed therethrough, the insert being disposed on the shim member in such a manner that the aperture communicates with the bore of the shim member.

11 Claims, 9 Drawing Sheets

CLAMPED CUTTING TOOL

BACKGROUND OF THE INVENTION

1. Field of the Invention

The present invention relates to a clamped cutting tool used in the metalworking field. More, specifically, it relates to improvements in a clamped cutting tool for firmly holding a cutting insert and a shim member which is laid under the cutting insert.

2. Prior Art

FIGS. 1 through 4 depict a conventional clamped cutting tool which comprises a point-center bent toolholder 20, right handed, including a forward end portion 24. A recess 30 with a generally rhombic shaped bottom face is formed in an upper surface of the forward end portion 24 and a cutting insert 32 of a rhombic shape is received in the recess 30 with a rhombic shim member 34 interposed therebetween. The bottom wall of the recess 30 is parallel to the upper surface of the forward end portion 24. The side walls of the recess 30, each of which is vertically upwardly extending from the bottom wall, have upper walls 54 at the level of the cutting insert 32 and lower walls 56 at the level of the rhombic shim member 34. The upper walls 54 slightly project from the lower walls 56. The recess 30 has a hole 36 of which the center axis is perpendicular to the bottom wall of the recess 30. The shim member 34 which may be made of steel or cemented carbide also has a hole 38 which is eccentric to the hole 36. Above the hole 38, the shim member 34 includes a bore 40 which has a larger diameter than the hole 38, and is concentric to the hole 38, but is at the center of the shim member 34. The cutting insert 32 has an aperture 42 at the center thereof, of which the diameter is smaller than that of the bore 40.

Figure 1:
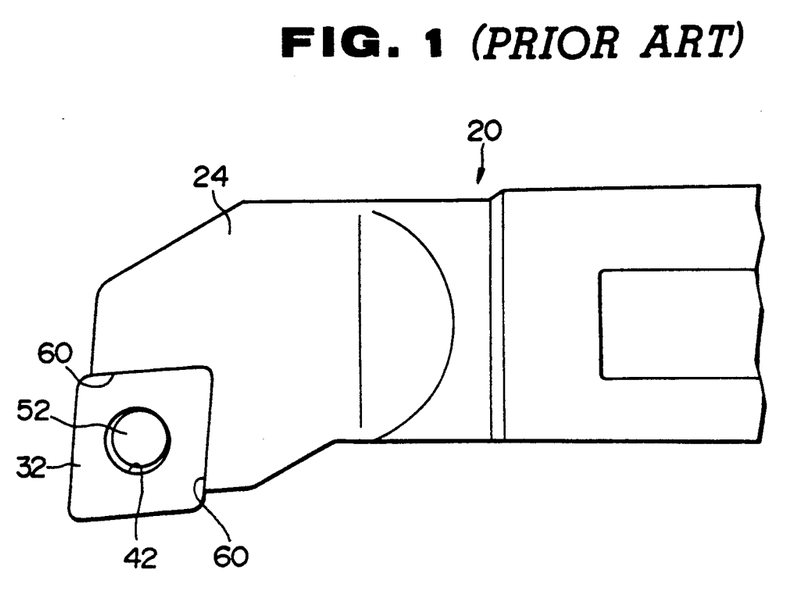
FIG. 1 is a schematic plan view showing a conventional clamped cutting tool.
Figures 2, 3, 4:
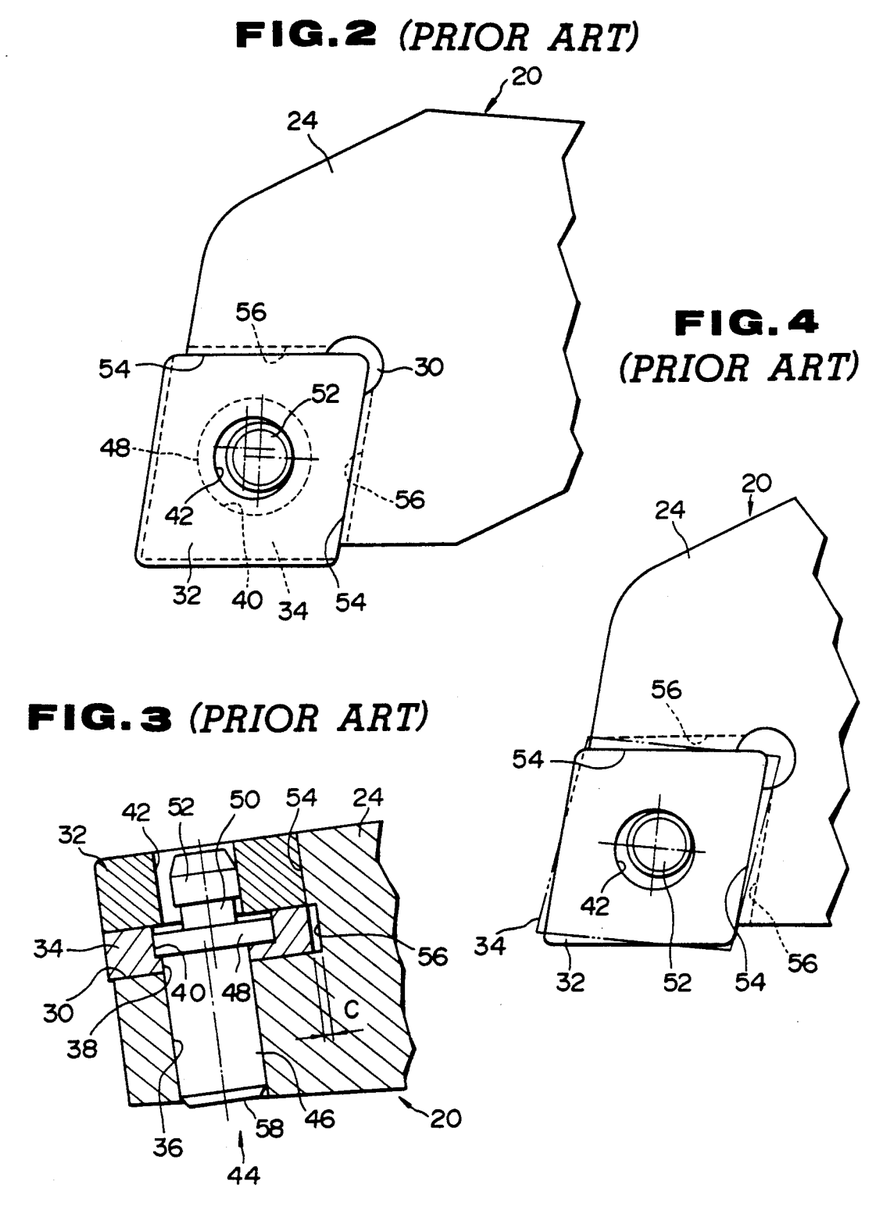
FIG. 2 is an enlarged plan view showing a conventional clamped cutting tool.
FIG. 3 is a side elevation showing the clamped cutting tool of FIG. 2.
FIG. 4 is a plan view showing the movement of the shim member of the clamped cutting tool of FIG. 2 during the cutting operation.

The cutting insert 32 is secured to the recess 30 in the following manner by a locking pin 44. The locking pin 44 consists of a large diameter rod portion 46, a flange portion 48 which is eccentric to the large diameter rod portion 46, a neck portion 50, and a head portion 52. Both the neck and head portions 50 and 52 are concentric to the flange portion 48. The flange portion 48 has a diameter which is approximately the same as that of the bore 40. The large diameter rod portion 46 of the locking pin 44 is downwardly inserted into the holes 36 and 38.

The reason why the flange and head portions 48 and 52 are made concentric is so that the bore 40 engaging with the flange portion 48 is located at the center of the shim member 34, and the aperture 42 engaging with the head portion 52 is located at the center of the cutting insert 32. Therefore the cutting insert 32 and shim member 34 can be symmetrical and consequently the toolholder mechanism can be applied to both point center bent tools, right handed and left handed.

The cutting insert 32 is mounted on the shim member 34 in such a manner as to be tightly fastened between the head portion 52 of the locking pin 44 and the side walls 54 of the recess 30. The shim member 34 is also fastened between the flange portion 48 and the side walls 56 of the recess 30. Because the locking pin 44 is rotatable about the axis of the hole 36, the cutting insert 32 and shim member 34 can be mounted on and removed from the recess 30. The locking pin 44 has a regular-hexagonal socket (not shown) at the bottom end surface 58 thereof, to be rotated with a hexagonal wrench.

The reason why the side walls of the recess 30 include the upper projected walls 54 is as follows. Since the flange and head portions 48 and 52 of the locking pin 44 are concentric to each other and eccentric to the large diameter rod portion 46, the shim member 34 and the cutting insert 32, which are retained by the flange portion 48 and the head portion 52 respectively, move with the rotation of the locking pin 44. If the shim member 34 contacts with the side walls 56 before the cutting insert 32 contacts the side walls 54, only the shim member 34 is substantially fastened nevertheless the cutting insert 32 is not tightly fastened. Hence, the upper side walls 54 project from the lower side walls 56, thereby providing a clearance "C" between the walls 54 and 56.

With the above construction, the clamped cutting tool, however, has the problems caused by the clearance "C". More specifically, the shim member 34 can not be tightly fastened between the side walls 56 and the flange portion 48 while the cutting insert 32 is tightly mounted. The shim member 34 may sometimes shake or budge on the recess 30 as shown by a two-dash-dot-line in FIG. 4, during the cutting operation. In case that the shaking or budging increases, the shim member 34 impacts upon the work piece, thereby interrupting stable cutting operations.

Figure 5:
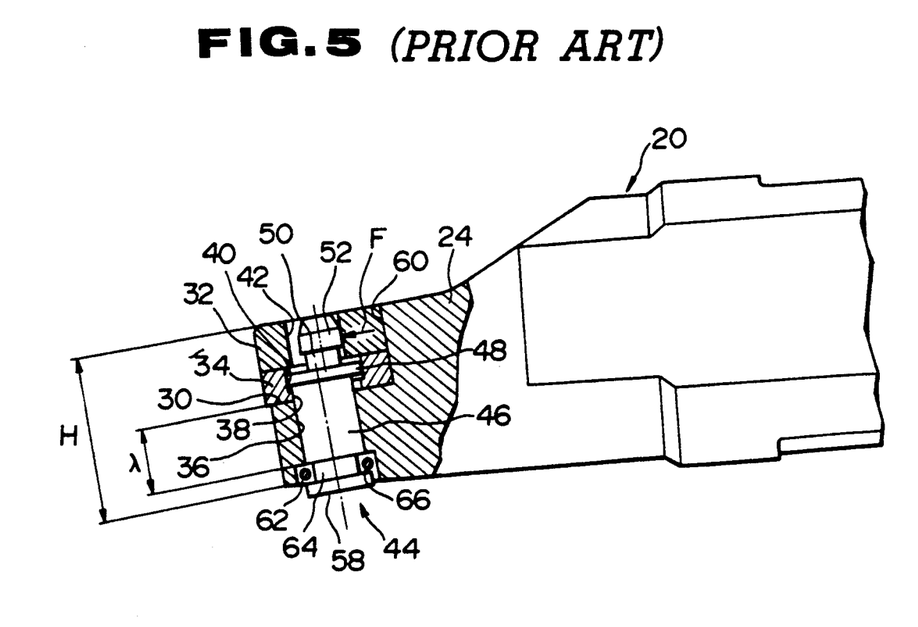
FIG. 5 is a side elevation showing another conventional clamped cutting tool.

Referring now to FIG. 5, another conventional clamped cutting tool is described. In the tool, the side walls 60 of the recess 30 do not have projection or clearance, but are simply vertically extending from the bottom wall thereof.

A mechanism for preventing the locking pin 44 from coming out when fastening the pin with the hexagon wrench is provided near the locking pin 44. More specifically, at the lower portion of the hole 36 is formed a larger diameter bore 62 which is concentric with the hole 36. The locking pin 44 has a circular groove 64 of which width is adequate to be accepted to the bore 62. Around the circular groove 64 is engaged a C-formed retaining ring 66 which is received in the bore 62, so that the locking pin 44 can be firmly locked at the hole 36.

In constructing the clamped cutting tool, after inserting the locking pin 44 into the bore 40 and holes 38 and 36, the locking pin 44 is further downwardly advanced, thereby the lower end thereof is slightly projected from the lower surface of the forward end portion 24. Next, the C-shaped ring 66 is engaged with the circular groove 64. The locking pin 44 is then upwardly thrusted to be positioned to the original location, so that the C-shaped ring 66 is received into the bore 62.

However, the clamped cutting tool has the following problems caused by the circular groove 64 and the bore 62. Due to the provision of the bore 62, a length "λ" of the locking pin 44 which contacts the inner peripheral surface of the hole 36 is shortened. A moment resulting from a resistance force "F" that is produced by action against the cutting insert 32 is received by the shortened length defined by "λ". Therefore, a resistance force of the tool-holder 20 against the moment is reduced. Especially, if the distance "H" of the forward end portion 24 is small, the tool-holder 20 can not provide sufficient holding force for the cutting insert 32.

SUMMARY OF THE INVENTION

Accordingly, it is an object of the present invention to provide a clamped cutting tool, which can firmly hold both of a cutting insert and a shim member laid under the cutting insert, thereby enabling accurate cutting operations to be performed.

It is another object of the invention to provide a locking pin which can firmly hold both of a cutting insert and a shim member under the cutting insert.

Another object of the invention is to provide a method for constructing the clamped cutting tool.

According to one preferred embodiment of the present invention, the clamped cutting tool includes a tool-holder, a shim member placed on the tool-holder, a cutting insert placed on the shim member, and a locking pin held in engagement with the tool-holder for clamping the cutting insert. The tool-holder includes a forward end portion having an insert receiving recess formed therein, the recess having a bottom wall and at least one side wall extending upwardly from the bottom wall, the bottom wall including a pin-receiving hole of a circular cross-section formed therein so as to extend downwardly. The shim member has a bore of a circular cross-section formed therethrough, the shim member being disposed on the bottom wall of the recess in such a manner that the bore communicates with and is concentric to the hole of the tool-holder. The cutting insert has an aperture of a circular cross-section formed therethrough, the insert being disposed on the shim member in such a manner that the aperture communicates with the bore of the shim member. The locking pin, which is of a circular cross-section for clamping the cutting insert on the tool-holder, has a rod portion, a head portion, and a radially outwardly protruding flange portion disposed between the rod portion and the head portion, the locking pin being formed so that the flange portion is concentric to the rod portion while the head portion is eccentric to the flange portion, the pin being inserted through the aperture of the cutting insert and the bore of the shim member into the pin-receiving hole of the tool-holder for rotation, with the rod portion and the flange portion being received in the pin-receiving hole of the tool-holder and the bore of the shim member, respectively. The head portion is held in abutting engagement with the aperture of the cutting insert to press the insert against the side wall of the holder.

It is desirable that the tool-holder comprises a pair of side walls that determine the bottom wall of the recess to be substantially rhombic. The cutting insert and the shim member are substantially rhombic. The center of the bore of the shim member is located on a diagonal line of the rhombus of the shim member, but is not on the center of the rhombus.

In accordance with another preferred embodiment, the forward end portion of the tool-holder has an elongated hole formed generally tangential to the pin receiving hole and communicating therewith. The rod portion of the locking pin includes a circumferential groove formed in an outer peripheral surface thereof so as to communicate with the elongated hole. An engaging pin is releasably accommodated in said elongated hole so as to partly pass through said circumferential groove, thereby preventing the locking pin from moving axially.

DETAILED DESCRIPTION OF THE PREFERRED EMBODIMENTS

Various preferred embodiments of the present invention will be described hereinafter with reference to accompanying drawings.

Figures 6, 7, 8, 9:
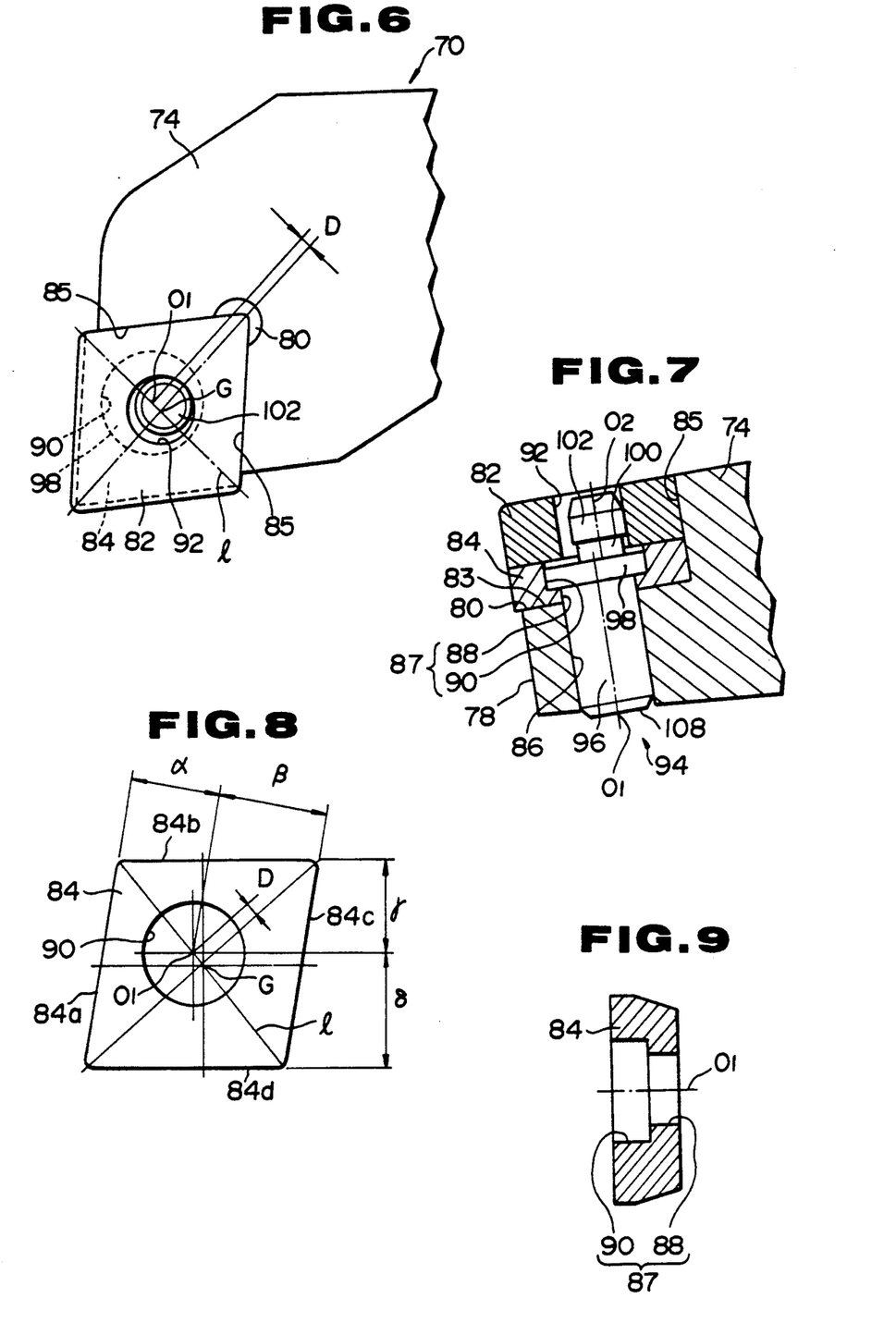
FIG. 6 is a plan view showing a clamped cutting tool according to a first preferred embodiment of the present invention.
FIG. 7 is a side elevation showing the clamped cutting tool of FIG. 6.
FIG. 8 is a plan view of a shim member used in the clamped cutting tool shown in FIGS. 6 and 7.
FIG. 9 is a side elevation showing the shim member of FIG. 8.
Figure 10:
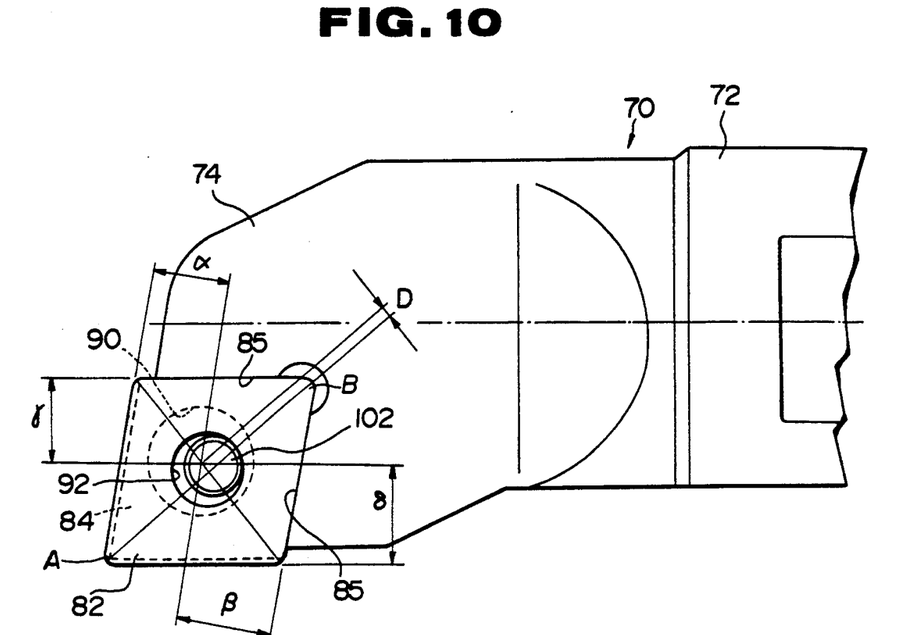
FIGS. 10 and 11 are plan views showing the same clamped cutting tools as in FIG. 6, which have a right-handed point-center bent tool body and a left-handed point-center bent tool body, respectively.

FIGS. 6, 7, and 10 depict a clamped cutting tool according to a first embodiment of the present invention. The clamped cutting tool comprises a point-center bent tool-holder 70, right handed, including a shank 72 and forward end portion 74. A lower surface of the forward end portion 74 is flush with the base surface of the shank 72, and an upper surface of the forward end portion 74 is inclined with respect to the lower end portion, so that the forward end portion 74 tapers to the end face 78 (as best shown in FIG. 7). An insert receiving recess 80 with a generally rhombic shaped bottom face is formed in the upper surface of the forward end portion 74 and an indexable cutting insert 82 of a rhombic shape is received in the recess 80 with a shim member 84 of a rhombic shape interposed therebetween. The bottom wall 83 of the recess 80 is parallel to the upper surface of the forward end portion 74. A pair of side walls 85, each of which is vertically upwardly extending from the bottom wall 83, are adjacent via an acute corner, thereby defining the bottom wall 83 to be rhombic.

The forward end portion 74 has a pin-receiving hole 86 of a circular cross-section therethrough, of which the axis is perpendicular to the bottom wall 83 of the recess 80 at a location that is slightly eccentric to the center of the rhombus shape of the bottom wall 83 in a following mentioned fashion. The shim member 84 made of steel also has a bore 87 of a circular cross-section therethrough with the bore center at location that is on a shorter diagonal line "l" of the rhombic shape and is spaced a distance "D" from the center "G" of the rhombic shape as shown in FIGS. 8 and 9. The shim member can be made of cemented carbide. The bore 87 comprises a lower small diameter portion 88 which is of an approximately the same diameter as the pin-receiving hole 86, and an upper larger diameter portion 90 concentric the small diameter portion 88 (see an axis $0_1$ of their center axis), with a diameter larger than the small diameter portion 88. The location of the pin-receiving hole 86 is determined such that when the shim member 84 just contacts the side walls 85 of the recess 80, the bore 87 and hole 86 concentrially communicate to each other. (see the axis $0_1$ again) The cutting insert 82 has an aperture 92 of a circular cross-section at the center thereof, of which the diameter is smaller than that of the larger diameter portion 90. Therefore, the aperture 92 eccentrically communicates with the bore 87 and pin-receiving hole 86.

Returning to FIGS. 6 and 7, the cutting insert 82 is secured to the recess 80 in the following manner by a locking pin 94 of a circular cross-section. The locking pin 94 consists of a large diameter rod portion 96, a radially outwardly protruding flange portion 98 which is coaxial to the large diameter rod portion 96, and a neck and head portions 100 and 102, both the neck and head portions 100 and 102 being eccentric to the flange portion 98. In the figures, the axis $0_1$ of the pin-receiving hole 86 and bore 87 also is a center axis of the rod and flange portions 96 and 98, and $0_2$ denotes a center axis of the neck and head portions 100 and 102. The large diameter rod portion 96 has a diameter which is slightly larger than that of the hole 86 and smaller diameter portion 88 of the bore 87. The flange portion 98 has a diameter which is approximately the same as that of the large diameter portion 90 of the bore 87. The large diameter rod portion 96 of the locking pin 94 is downwardly inserted into the holes 86 and the smaller diameter portion 88. Also the flange portion 98 is downwardly inserted into the larger diameter portion 90.

The cutting insert 82 is mounted on the shim member 84 in such a manner as to be tightly fastened between the head portion 102 of the locking pin 94 and the side walls 85 of the recess 80. The head portion 102 is held in abutting engagement with the aperture 92 of the insert 82 to press the insert 82 against the side walls 85 of the holder 70. The shim member 84, which is already substantially restricted by the side walls 85 and the flange portion 98 in lateral directions, is completely fastened by friction between the cutting insert 82 and itself. Since the locking pin 94 is rotatable about the axis $0_1$ of the pin-receiving hole 86, the locking pin 94 can be mounted in and removed from the recess 80. The locking pin 94 has a regular-hexagonal socket (not shown) at the bottom surface 108 thereof, so that it can be rotated with a hexagonal wrench.

For assembling the clamped cutting tool, the shim member 84 is placed on the bottom wall 83 of the recess 80. The large rod portion 96 of the locking pin 94 is then downwardly inserted into the small diameter portion 88 and the hole 86. Simultaneously, the flange portion 98 is accepted by the large diameter portion 90 of the bore 87. Thereafter, the cutting insert 82 is placed on the shim member 84, and the head portion 102 inserted into the aperture 92. The hexagon wrench is then inserted into the hexagonal socket and turned, so that the cutting insert 82 is clamped to the tool-holder 70.

As described above, the flange portion 98 and the large diameter rod portion 96 are concentric to each other in the clamped cutting tool. Therefore, even if the large diameter rod portion 96 is rotated by the hexagonal wrench, the shim member 84 does not move on the bottom wall 83 of the recess 80. Thus, different from one of the conventional clamped cutting tools shown in FIGS. 1 through 4, it is not necessary to form the large projection or a large step, between the levels of the cutting insert 82 and the shim member 84, of the side walls 85 of the recess 80. In addition, it is possible to abolish the need for any projection or step. Furthermore, both the cutting insert 82 and the shim member 84 are firmly mounted to the recess 80, thereby any shaking or budging of the cutting insert 82 and the shim member 84 is prevented. Consequently it is expected that the accuracy of the cutting operation is improved.

Since the center of the bore 87 of the shim member 84 is positioned on the diagonal line "l" connecting between the rhombic shim member's obtuse corners, as shown in FIG. 8, a distance "$\alpha$" between the center of the bore 87 and the one side 84a of the shim member 84; and a distance "$\gamma$" between the center of the bore 87 and the one side 84b of the shim member 84, which is adjacent to the side 84a via an obtuse corner, are equal to each other. A distance "$\beta$" between the center of the bore 87 and one side 84c, which is opposite to the side 84a; and a distance "$\delta$" between the center of the bore 87 and one side 84d, which is adjacent to the side 84c via an obtuse corner, are also equal to each other. In other words, the shim member 84 is symmetric about the shorter diagonal line "l".

Figure 11:
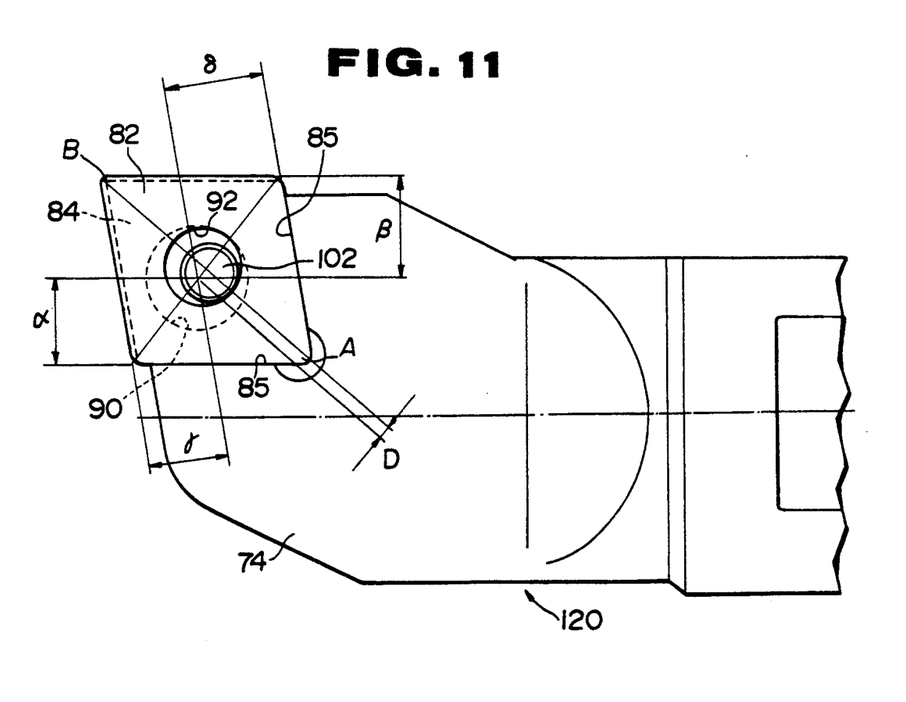

Accordingly, the above tool-holder mechanism can be applied to both point-center bent tools, right handed and left handed, referring to FIGS. 10 and 11. The tool-holder 70 which is of a point-center bent figure, right handed shown in FIG. 10 has been described above. The point-center bent tool 120, left handed, designated in FIG. 11 is characterized as to be completely symmetric to the tool-holder 70 of FIG. 10. The same shim member 84, cutting insert 82, and the locking pin 94 can be used in this left handed tool. In FIG. 10, a most outside corner of the shim member 84 is defined as corner "A", and a most inside corner of the shim member 84, which is opposite to the corner "A", is defined as corner "B". As shown in FIG. 11, the shim member 84 is placed on the recess 80 is such a manner that the corner "A" is located inside of the recess 80, and the corner "B" is located outside of the recess 80. In the other words, the shim member 84 is just oppositely angled in comparison with FIG. 10. Consequently, it is not necessary to prepare any other shim members for the left-handed tool.

While the center of the bore 87 of the shim member 84 is positioned on the diagonal line "1" connecting the rhombus' obtuse corners in the above embodiment, it is not limited to the above description, and the center may be positioned at a location on a longer diagonal line connecting the rhombus' acute corners.

Next, a preferred second embodiment of the present invention will be described referring to FIGS. 12 and 13, the second embodiment comprising an engaging means for preventing an axial movement of the locking pin 94. In the second embodiment, as shown in the figures, the same reference symbols denote the same elements of the first embodiment shown in FIGS. 6 through 11, and the description of the elements will be omitted for simplicity. Furthermore, while some of the elements are not shown, the elements are similar to those of the first embodiment.

Figure 12:
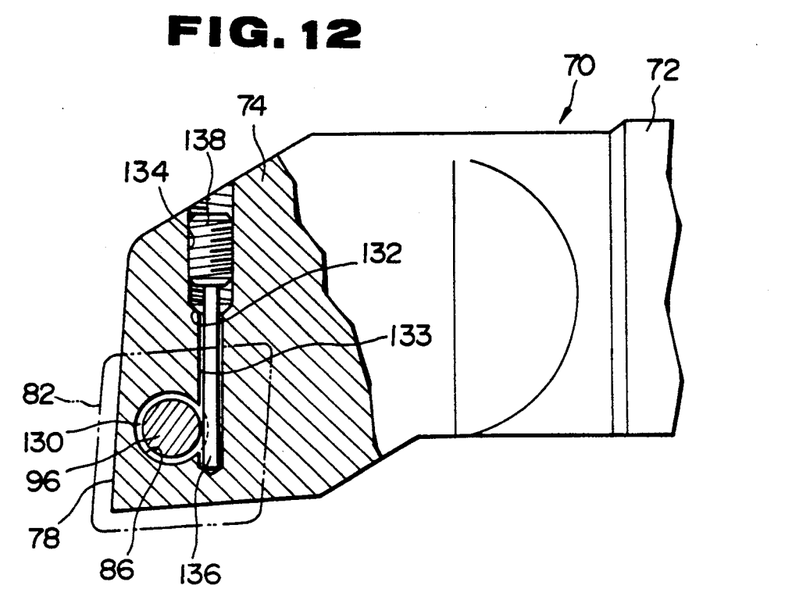
FIG. 12 is a cut away cross-sectional plan view of another clamped cutting tool according to a second preferred embodiment of the present invention.
Figure 13:
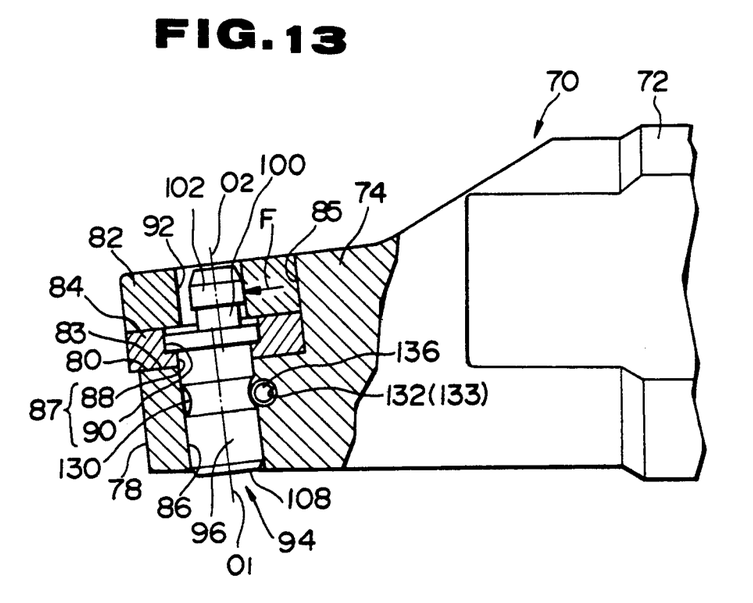
FIG. 13 is a side elevation of the clamped cutting tool shown in FIG. 12.

Referring to FIGS. 12 and 13, the large diameter rod portion 96 of the locking pin 94 includes a circumferential groove 130 which has a semi-circular cross-section on the outer peripheral surface thereof. The location of the groove 130 in the axial direction of the rod portion 96 is above the center of the height thereof. The tool-holder 70 comprises an elongated hole 132 of which the diameter is slightly smaller than that of the groove 130. The elongated hole 132 tangentially extends through the pin-receiving hole 86 and extends perpendicular to the center axis of the pin-receiving hole 86, opening to a side face of the forward end portion 74, which is away from the cutting insert. The elongated hole 132 includes a first portion 133 of a circular cross-section which penetrates inward so as to communicate with the pin-receiving hole 86, and an internally threaded second portion 134 disposed adjacent to the side face of the forward end portion 74 in coaxial relation with the first portion 133. When the locking pin 94 is inserted into the pin-receiving hole 86, the first portion 133 of the elongated hole 132 communicates with and partly passes through the circumferential groove 130. An engaging pin 136 of a circular cross-section is releasably inserted into the elongated hole 132. A screw 138 which is threadedly engaged with the second threaded portion 134 is held in abutment with the engaging pin 136 to confine the engaging pin 136 in position to engage with the circumferential groove 130.

In order to mount the cutting insert 82 in the above clamped cutting tool, first, the shim member 84 is placed on the bottom wall 83 of the recess 80. Next, the locking pin 94 is passed through the shim member 84 and the tool-holder 70, that is, the large diameter rod portion 96 is inserted into the smaller diameter portion 88 and hole 86, and the flange portion 98 is inserted into the large diameter portion 90. The engaging pin 136 is then inserted into the elongated hole 132, thereby the engaging pin 136 is brought into abutment with the circumferential groove 130 of the large diameter rod portion 96. The screw 138 is then engaged with the second threaded portion 134 to confine the engaging pin 136. The hexagonal wrench is then engaged in the hexagonal socket and turned to rotate the locking pin 94, thereby the eccentric head portion 102 is rotated about the axis of the large diameter rod portion 96. Therefore, the cutting insert 82 is clamped between the head portion 102 of the locking pin 94 and the side walls 85 of the tool-holder 70.

According to the above clamped cutting tool, when the locking pin 94 is rotated with the hexagonal wrench, the locking pin 94 cannot move out upwardly from the pin-receiving hole 86 of the tool-holder 70.

Furthermore, in comparison with the conventional clamped cutting tool depicted in FIG. 5, in is not necessary to shape the bore 62 below the hole 36. The large diameter rod portion 96 of the locking pin 94 contacts with whole length of the pin-receiving hole 86, directly or via the engaging pin 136. The moment produced by a resistance force "F" that acts on the cutting insert 32, is carried by the whole length of the large diameter rod portion 96. In other words, with the above construction the cutting insert 82 and the shim member 84 are firmly fastened by the locking pin 94.

Figure 14:
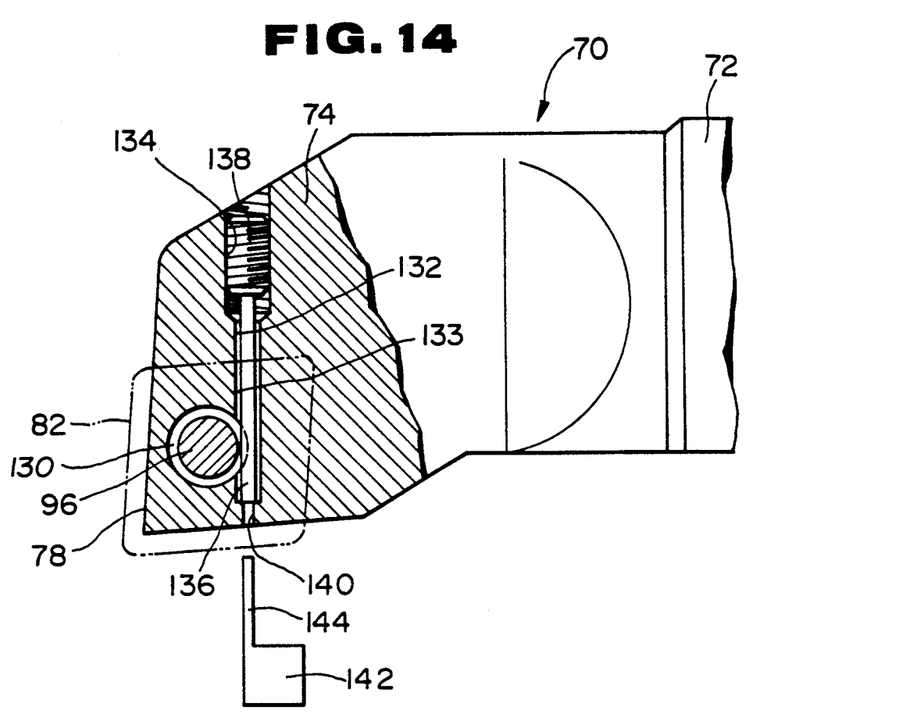
FIG. 14 is a cut away cross-sectional plan view of a modification of the clamped cutting tool of the second embodiment.

A modification of the second embodiment is shown in FIG. 14. In FIG. 14, a communication aperture 140 which is concentric to the hole 132 is extended from the first portion 133 of the hole 132 to a side of the forward end portion 74, which is opposite to the side including the threaded portion 134. The diameter of the communicating aperture 140 is smaller than that of the engaging pin 136.

The modification shown in FIG. 14 has advantages not only as described in the second embodiment. If the locking pin 94 and the engaging pin 136 are held in frictional engagement with each other, a jig 142 which has a rod-like projection 144 of a circular crosss section is inserted and advanced into the communicating aperture 140 to remove the engaging pin 136 after releasing the screw 138.

Figure 15:
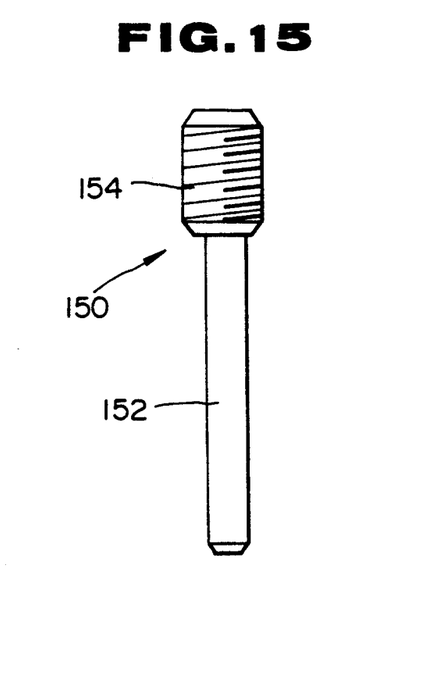
FIG. 15 is a side view of an engaging pin used in a further modified clamped cutting tool of the second embodiment.

While the engaging pin 136 and the screw 138 are of two separate elements in the second embodiment shown in FIGS. 12 and 13, another engaging pin 150 shown in FIG. 15 can be substituted. The engaging pin 150 consists of a pin portion 152 of a circular cross-section to be acommodated in the first portion 133 of the elongated hole 132 and a screw portion 154 extending coaxially from the pin portion 152 to be threadedly engaged with the second threaded portion 134 of the elongated hole 132. In other words, the engaging pin 150 is constructed as an element in which the engaging pin 136 and the screw 138 are coaxially united. In accordance with the engaging pin 150, only rotating the screw portion 154 results confinement or removal of the engaging pin 150. Therefore, the locking pin 94 can be easily mounted on or removed from the tool-holder 70. Furthermore, it is not exactly essential to form the communication aperture 140.

Figure 16:
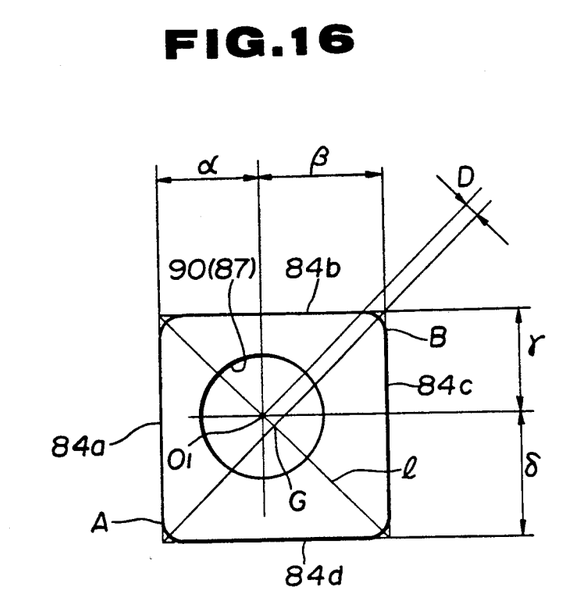
FIG. 16 is a plan view of a shim member used in a clamped cutting tool according to a third embodiment of the present invention.
Figure 17:
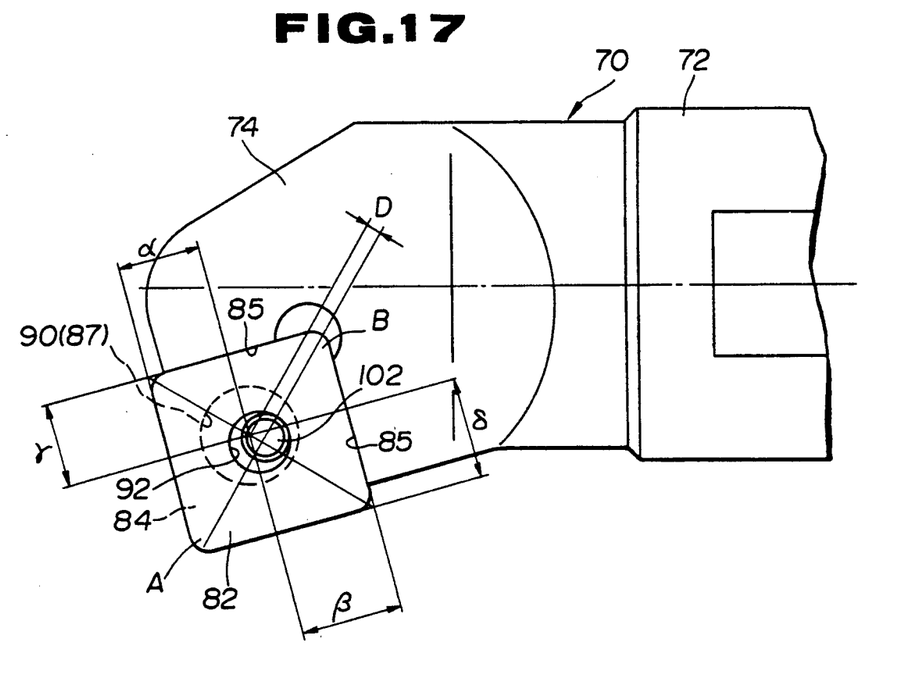
FIG. 17 is a plan view showing the clamped cutting tool of the third embodiment, which has a right-handed point-center bent tool body.
Figure 18:
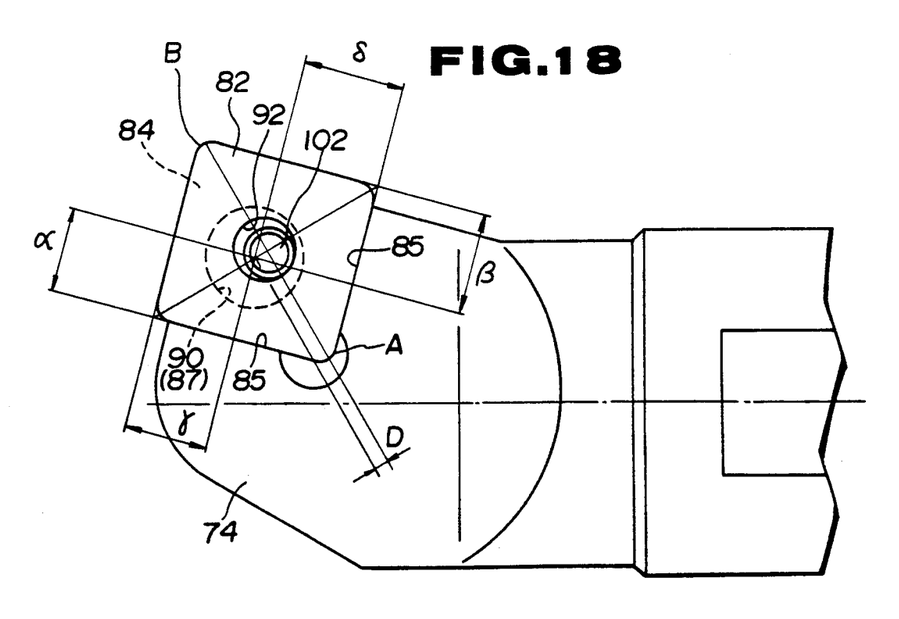
FIG. 18 is a plan view showing another clamped cutting tool of the third embodiment, which has a left-handed point-center bent tool body.

FIGS. 17 and 18 depict a clamped cutting tool according to a third embodiment of the present invention. FIG. 16 depicts a shim member 84 used in the clamped cutting tool. The third embodiment is a modification of the first embodiment. The recess 80 has a generally square shaped bottom face. The side walls 85 are adjacent via a right angle corner, thereby defining the bottom wall 83 to be square. The shim member 84 and the cutting insert 82 are also of a square shape. The locations of the pin-receiving hole 86, the bore 87, and the aperture 92 are determined as similar to the first embodiment shown in FIGS. 6 through 11. Therefore, the tool-holder mechanism can be applied to both point-center bent tools, right handed and left handed, referring to FIGS. 17 and 18.

Figure 19:
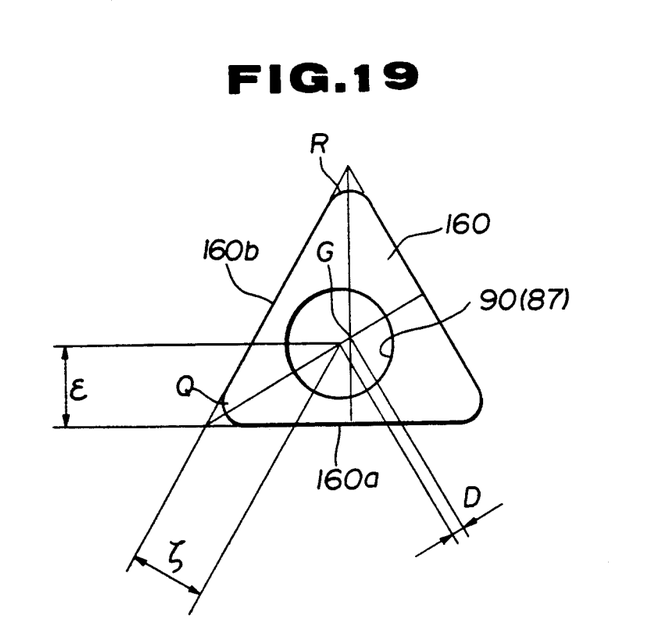
FIG. 19 is a plan view of a shim member used in a clamped cutting tool according to a fourth embodiment of the present invention.
Figure 20:
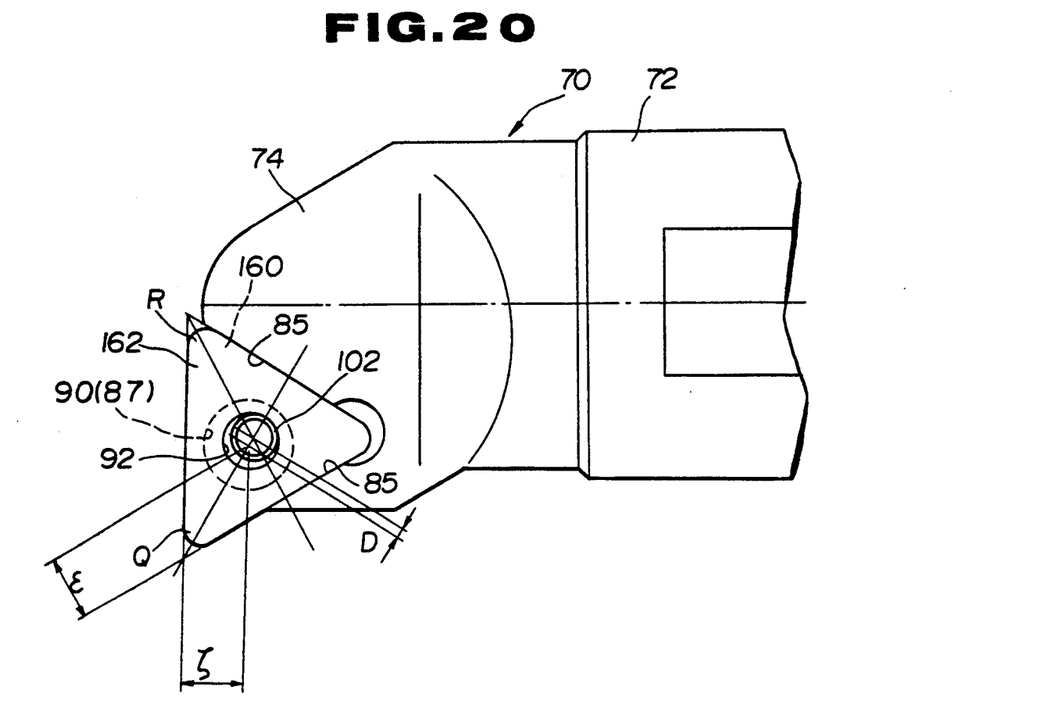
FIG. 20 is a plan view showing the clamped cutting tool of the fourth embodiment, which has a right-handed point-center bent tool body.
Figure 21:
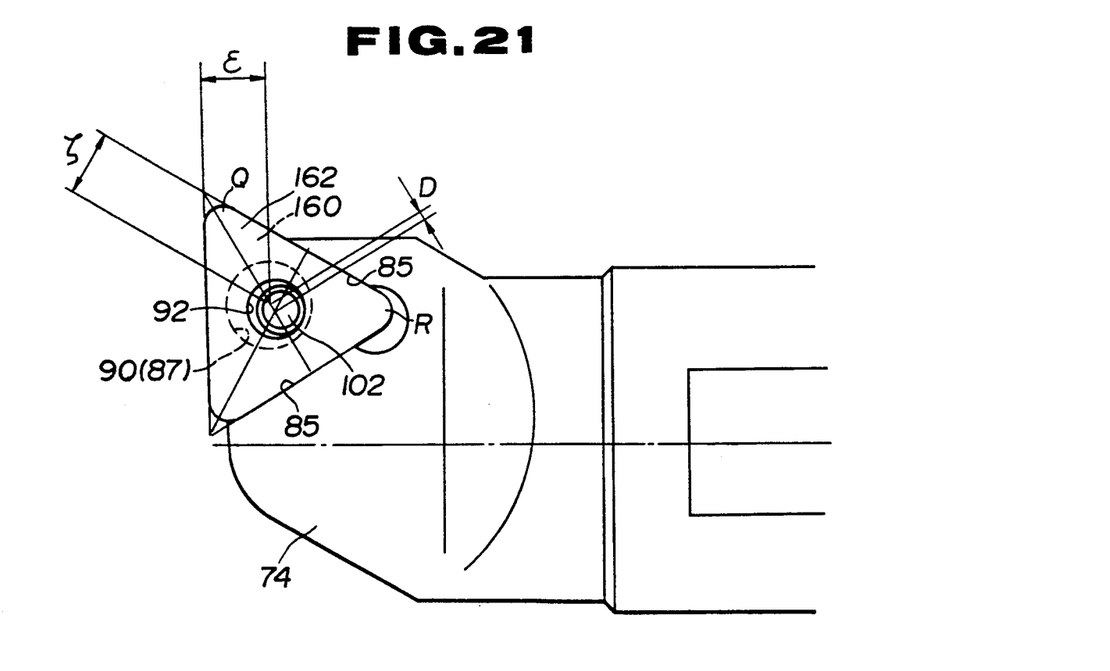
FIG. 21 is a plan view showing another clamped cutting tool of the fourth embodiment, which has a left-handed point-center bent tool body.

While the shim member 84 and cutting insert 82 are rhombic in the above embodiments, other diagonal shim members and cutting insert can be used in the present invention. FIGS. 20 and 21 depict a clamped cutting tool according to a fourth embodiment of the present invention and exemplify a generally regular triangular shim member 160 and a generally regular triangular cutting insert 162. FIG. 19 depicts a shim member 160 used in the clamped cutting tool. The side walls 85 are adjacent via 60° corner, thereby defining the bottom wall 83 to be adequate to accept the regular triangular shim member 160. The center of the bore 87 of the shim member 160 is located at location that is on a symmetric line "m" of the regular triangular shape and is spaced a distance "D" from the center "G" of the regular triangular shape as best shown in FIG. 19. The pin-receiving hole 86 of the recess 80 is formed to communicate concentrically with the bore 87. The center of the aperture 92 of the cutting insert 162 is located at the center of the regular triangular shape, therefore eccentrically communicate to the bore 87 and pin-receiving hole 86.

According to the location of the bore 87, a distance "$\epsilon$" between the center of the bore 87 and a side 160a of the shim member 160 and a distance "$\zeta$" between the center of the bore 87 and a side 160b of the shim member 160 are equal to each other. Therefore, the tool-holder mechanism can be applied to both point-center bent tool holder body, right handed and left handed, as respectively shown in FIGS. 20 and 21. In FIG. 20, a forward and outside corner of the shim member 160 is defined as corner "Q", and a forward inside corner of the shim member 160, which is opposite to the corner "Q", is defined as corner "R". As shown in FIG. 21, the shim member 160 is placed on the recess 80 is such a manner that the corner "Q" is also located forward outside of the recess 80, and the corner "R" is located backward inside of the recess 80. Consequently, it is not necessary to prepare any other shim members for the left-handed tool.

Even a shim member and cutting insert of a circular shape can be applied to the present invention. In the case, the tool-holder includes a side wall which is concave to describe an arc to be fit with the shim member and cutting insert. The aperture of the cutting insert is disposed on a center point of the circular shape. The bore of the shim member is disposed on a center axis of the circular shape of the shim member but is not on the center point.

What is claimed is:

1. A clamped cutting tool comprising:
   a tool-holder including a forward end portion having an insert receiving recess formed therein, said recess having a bottom wall and at least two side walls extending upwardly from said bottom wall, said bottom wall including a pin-receiving hole of a circular cross-section formed therein so as to extend downwardly;
   a shim member having a bore of a circular cross-section formed therethrough, said shim member being disposed on said bottom wall of said recess in such a manner that said bore communicates with and is concentric to said pin-receiving hole of said tool-holder;
   a cutting insert having an aperture with a circular cross-section formed therethrough, said insert being disposed on said shim member in such a manner that said aperture communicates with said bore of said shim member; and
   a locking pin of a circular cross-section for clamping said cutting insert in said tool-holder, said locking pin having a rod portion, a head portion, and a radially outwardly protruding flange portion disposed between said rod portion and said head portion;
   said locking pin being formed so that said flange portion is concentric to said rod portion while said head portion is eccentric to said flange portion, said pin being inserted through said aperture of said cutting insert and said bore of said shim member into said pin-receiving hole of said tool-holder for rotation, with said rod portion and said flange portion being received in said pin-receiving hole of said tool-holder and said bore of said shim member, respectively, so that said head portion is held in abutting engagement with said aperture of said cutting insert to press said insert against said side walls of said holder;
   said shim member and said cutting insert being in a form of a figure which is bilateral about at least an axis and radially symmetric and has a center point of radial symmetry; and
   said aperture of said cutting insert being located on said center point, and said bore of said shim member being located on said axis but not being on said center point.

2. A clamped cutting tool according to claim 1, in which said tool-holder includes a pair of side walls disposed so that said bottom wall defines a generally rhombic shape, said cutting insert and said shim member are of a generally rhombic shape, said aperture of said cutting insert is located on the center point of the rhombic shape, and said bore of said shim member is disposed on a diagonal line of the rhombic shape but is not on the center point of the rhombic shape.

3. A clamped cutting tool according to claim 2, in which said tool-holder includes a pair of side walls disposed so that said bottom wall defines a generally square shape, said cutting insert and said shim member are of a generally square shape, said aperture of said cutting insert is disposed on the center point of the square shape, and said bore of said shim member is disposed on a diagonal line of the square shape but is not on the center point.

4. A clamped cutting tool according to claim 1, in which said tool-holder includes a pair of side walls disposed to be adjacent via a 60° corner, said cutting insert and said shim member are of a generally regular triangular shape, said aperture of said cutting insert is disposed on a center point of the regular triangular shape, and said bore of said shim member is disposed on a symmetric axis of the regular triangular shape but is not an the point.

5. A clamped cutting tool according to claim 1, further comprising engaging means for preventing an axial movement of said locking pin.

6. A clamped cutting tool according to claim 5, in which said forward end portion of said tool-holder has an elongated hole formed generally tangential to said pin receiving hole and communicating therewith, said rod portion of said locking pin including a circumferential groove formed in an outer peripheral surface thereof so as to communicate with said elongated hole, said engaging means comprising an engaging pin releasably accommodated in said elongated hole so as to partly pass through said circumferential groove.

7. A clamped cutting tool according to claim 6, in which said elongated hole is formed so as to open to an outer surface of said forward end portion and comprises a first portion disposed adjacent to and communicating with said pin receiving hole and and internally threaded second portion disposed adjacent to said outer surface in coaxial relation with said first portion, said engaging means comprising said engaging pin accommodated in said first portion of said elongated hole and a screw threadedly engaging with said second threaded portion and held in abutment with said engaging pin to retain said engaging pin in position.

8. A clamped cutting tool according to claim 7, in which said forward end portion has a communication aperture commmunicating with said first portion of said elongated hole and opening to another outer surface of said forward end portion, said communication aperture having a smaller cross-section than said first portion of said elongated hole.

9. A clamped cutting tool according to claim 6, in which said elongated hole is formed so as to open to an outer surface of said forward end portion and comprises a first portion disposed adjacent to and communicating with said pin receiving hole and and internally threaded second portion disposed adjacent to said outer surface in coaxial relation with said first portion, said engaging pin being comprised of a portion accommodated in said first portion of said elongated hole and screw portion threadedly engaging with said threaded portion.

10. A method for constructing a clamped cutting tool as defined in claim 6, the method comprising:
 (a) placing said shim member onto said bottom wall of said recess in such a manner that an outer side of the shim member contacts said side wall of the recess;
 (b) equipping said locking pin onto said forward end portion of the tool-holder in such a manner that said rod portion is inserted into said pin-receiving hole of the tool-holder, and said flange portion is received by the bore of the shim member;
 (c) piling said cutting insert onto the shim member is such a manner that said aperture of the cutting insert surrounds said head portion of the locking pin;
 (d) inserting said engaging pin into said elongated hole to restrict the axial movement of said locking pin; and
 (e) revolving said locking pin about the center axis of said rod portion, thereby clamping the cutting insert between the head portion and the side wall of the recess.

11. A method for constructing a clamped cutting tool as defined in claim 7, the method comprises the following steps of:
 (a) placing said shim member onto said bottom wall of said recess in such a manner that outer sides of the shim member contacts said side walls of the recess;
 (b) equipping said locking pin onto said forward end portion of the tool-holder in such a manner that said rod portion is inserted into said pin-receiving hole of the tool-holder, and said flange portion is received by the bore of the shim member;
 (c) piling said cutting insert onto the shim member in such a manner that said aperture of the cutting insert surrounds said head portion of the locking pin; and
 (d) revolving the locking pin about the center axis of the rod portion, thereby clamping the cutting insert between the head portion and the side walls of the recess.

* * * * *